(12) United States Patent
Macchia et al.

(10) Patent No.: US 9,568,142 B2
(45) Date of Patent: Feb. 14, 2017

(54) COUNTERBALANCING STRUCTURE

(71) Applicant: CARTONI S.P.A., Rome (IT)

(72) Inventors: Domenico Macchia, Rome (IT); Alessandro Fiore, Rome (IT)

(73) Assignee: CARTONI S.P.A., Rome (IT)

( * ) Notice: Subject to any disclaimer, the term of this patent is extended or adjusted under 35 U.S.C. 154(b) by 0 days.

(21) Appl. No.: 14/964,547

(22) Filed: Dec. 9, 2015

(65) Prior Publication Data

US 2016/0169440 A1   Jun. 16, 2016

(30) Foreign Application Priority Data

Dec. 10, 2014   (EP) ..................................... 14425152

(51) Int. Cl.
| | | |
|---|---|---|
| *A47F 5/00* | (2006.01) | |
| *F16M 11/20* | (2006.01) | |
| *F16M 11/10* | (2006.01) | |
| *F16G 9/00* | (2006.01) | |

(52) U.S. Cl.
CPC ............. *F16M 11/2021* (2013.01); *F16G 9/00* (2013.01); *F16M 11/10* (2013.01); *F16M 11/105* (2013.01); *F16M 2200/041* (2013.01)

(58) Field of Classification Search
CPC ... F16M 11/2021; F16M 11/10; F16M 11/105; F16M 2200/041; F16G 9/00
See application file for complete search history.

(56) References Cited

U.S. PATENT DOCUMENTS

| | | | | |
|---|---|---|---|---|
| 3,019,156 | A  * | 1/1962 | Lundberg ............ | D06M 13/332 162/166 |
| 3,659,932 | A  * | 5/1972 | Bach ...................... | G03B 31/02 352/242 |
| 4,206,983 | A  * | 6/1980 | Nettman ................... | A45F 3/10 224/201 |
| 4,989,229 | A  * | 1/1991 | Negrelli ................. | A61B 6/105 378/193 |
| 5,850,579 | A | 12/1998 | Melby | |
| 7,533,856 | B2 | 5/2009 | Mollenhauer | |
| 2011/0200320 | A1* | 8/2011 | Chapman .............. | B66C 13/066 396/428 |

FOREIGN PATENT DOCUMENTS

| | | |
|---|---|---|
| EP | 0190062 A1 | 8/1986 |
| GB | 2340103 A | 2/2000 |

OTHER PUBLICATIONS

English Abstract of EP 0190062A1 dated Aug. 6, 1986.
Extended European Search Report dated Jun. 25, 2015.

\* cited by examiner

*Primary Examiner* — Amy Sterling
(74) *Attorney, Agent, or Firm* — Hedman & Costigan, P.C.; James V. Costigan; Kathleen A. Costigan (57) ABSTRACT

The present invention concerns a counterbalancing structure (1) for counterbalancing a load, where the counterbalancing structure (1) has support means (3) for the support of the load, said support means (3) being able to rotate along a plane or vertical plane (β) with respect to a first axis or vertical axis (y) laying on said plane (β), a first movable pulley group (2) having at least a first upper pulley (4, 5), precompressed elastic means (10), and at least a rope or line (11, 12) fixed at a first end to said elastic means (10) and at the second end to the support means (3), the at least a rope (11, 12) passing at least on at least a first upper pulley (4, 5) such to act in compression on the elastic means (10) when the load is coupled to the support means (3).

12 Claims, 8 Drawing Sheets

COUNTERBALANCING STRUCTURE

The present invention concerns a structure for counterbalancing a load in a stable equilibrium in any angular position, and in particular, but not exclusively, a load represented by a images capturing means.

Such a counterbalancing structure can be applied to a support head for cameras and movie cameras, although it is obvious that it can be utilised in other applications, and that therefore the example cannot be unduly utilised as limitation of the present invention.

More in detail, the present invention concerns a counterbalancing structure having an improved mechanism for adjusting the counterbalancing on the vertical plane to support different weight loads.

As it is known, in order to balance a load, it is necessary to perform the balancing both along the horizontal plane and on the vertical plane.

For example, in the field of application of capturing devices, such balancing should be able to be obtained both when the load, and therefore for example the camera, is in a static position, and when the camera is in a dynamic position, in such a way to allow the camera itself to move with a uniform movement without disturbing the current shooting.

Moreover, the counterbalancing structure must be able to support loads with different dimensions and therefore of different weights, always guaranteeing an optimum balancing of the weight.

The patent No. IT1302411, of the same Applicant, describes a counterbalancing system applied to the head for the support of a camera, which is able to balance in optimal way the weight on both the horizontal and vertical planes, in particular it is able to solve the problems relevant to the balancing along the vertical plane. Indeed, because of the continuous variation of position of the mass centre of the camera when it is rotated in any angle along the 180° arc of the vertical plane, the counterbalancing system must compensate the overturning momentum due to such a variation, in order to guarantee equilibrium in every position.

Such a counterbalancing system of known type, in particular for support heads for cameras or movie cameras, comprises fixing means for the fixing of the shooting means, a support of said fixing means, a first movable pulleys system, with staggered and vertically movable axes, a group of pre-compressed elastic elements, and at least two ropes or lines which are fixed to an end of said elastic elements group and at the other end of said support, each passing on one of said first pulleys pair. Such two ropes act one after the other in compression on said elastic elements group, respectively when the load coupled to said fixing means is inclined with respect to the vertical by an angle equal to 0°-+90° and 0°--90°.

Such technical solution for a counterbalancing structure allows to create a reacting momentum which is equal and opposite to the acting instantaneous momentum due to the load, because such load must be considered as a variable, allowing at the same time to mount on the same head shooting means having different weights, the system is provided with adjusting which allows it to adapt to the different loads.

However, such a counterbalancing structure of the prior art shows the disadvantage of having a relatively limited load range.

Moreover, a further disadvantage of the counterbalancing structure of the prior art is in the quality of the response of the elastic means with respect to the different load configurations, given that the optimal response is obtained only in a determined configuration. This is due to the difficulty of having an optimal pre-compression of the elastic means with respect to the load variation, without the direct intervention by means of a preparatory calibration action.

It is object of the present invention to obtain a load counterbalancing structure which is able to have a load range which is larger than that of the prior art.

Moreover, another object of the present invention is to obtain an improvement of the quality of the response of the elastic means with respect to the different load configurations, obtaining a system for the counterbalancing of the optimal load with varying angle of inclination with respect to the vertical and with varying load to be counterbalanced. This has been obtained by a mechanism which is able to tune the counterbalancing system capacity and at the same time the pre-loading of the elastic means in an automatic way, without a calibration preparatory action.

It is subject-matter of the present invention a counterbalancing structure for counterbalancing a load, said counterbalancing structure comprising support means for the support of said load, said support means being able to rotate along a plane or vertical plane with respect to a first axis or vertical axis laying on said plane, a first movable pulleys group comprising at least a first upper pulley, precompressed elastic means, and at least a rope or line fixed at a first end to said elastic means and at the second end to said support means, said at least a rope passing at least on said at least a first upper pulley such to act in compression on said the elastic means when said load is coupled to said support means and said support means are rotated with respect to said first axis or vertical axis by an angle equal to 0°-+90° or 0°--90° in order to counterbalance the weight of said load, said at least a first upper pulley being movable along a second axis in such a way to vary the capacity of the load of said support means and in such a way to be able to counterbalance the weight of said load when it is coupled to said support means, said counterbalancing structure being characterised in that it comprises an adjusting mechanism for the adjusting of the pre-compression of said elastic means configured in such a way to adjust the pre-compression of said elastic means with varying load to be supported by said support means by means of the movement of said at least a first upper pulley along said second axis.

In particular, according to the invention, said adjusting mechanism may be configured in such a way to act on said elastic means in such a way to increase the pre-compression of said elastic means when said at least a first upper pulley is disposed in the point along said second vertical axis which is the most distant from said support means and in such a way to decrease the pre-compression of said elastic means when said at least a first upper pulley is disposed on the point along said second vertical axis which is closest to said support means.

Still according to the invention, said adjusting mechanism may comprise first transmission means for the transmission of the linear motion of said at least a first pulley along said second axis, second transmission means acting on said elastic means in compression, and third transmission means for transmitting the motion of said first to said second transmission means.

Always according to the invention, said adjusting mechanism may further comprise fourth motion transmission means disposed between said third and said second transmission means and in that said fourth transmission means are configured in such a way to engage alternately with both said third and said second transmission means, or only with said third transmission means or only with said second transmission means in order to allow the individual adjusting.

Further according to the invention, said adjusting mechanism may comprise actuator means connected to said third transmission means or to said fourth transmission means in such a way to vary the capacity of the load to be supported by said support means and at the same time to adjust the pre-compression of said elastic means.

Moreover, said transmission means may comprise gears, preferably gear wheels.

In particular, said fourth transmission means may comprise a first gear and a second gear coupled to a shaft, said gears of said fourth transmission means having a width and being spaced apart from each other on said shaft in such a way that said fourth transmission means are able to pass from a first position, wherein said second gear of said fourth transmission means is engaged with a gear of said second transmission means, a second position, wherein said second gear of said fourth transmission means is engaged with a gear of said third transmission means, or a third position, wherein said second gear of said fourth transmission means is engaged with said gear of said third transmission means and at the same time said first gear of said fourth transmission means is engaged with said gear of said second transmission means.

Still according to the invention, said third transmission means may comprise a first gear and a second gear which are coupled to a shaft, wherein said first gear of said third transmission means is adapted to engage with a gear of said second or said fourth transmission means.

Further according to the invention, said counterbalancing structure may comprise a second fixed pulleys group comprising at least a lower pulley through which said at least a rope passes before coupling to said elastic means.

Preferably according to the invention, said first pulleys group may comprise a worm acting on said at least an upper pulley for its movement along said second axis.

Always according to the invention, said elastic means may comprise a spring, a plate, coupled at the first end of said spring and coupled to said first end of at least a rope, and a preload ring nut acting in compression on the opposite end of said spring and in connection with said adjusting mechanism.

Finally, according to the invention, said first axis or vertical axis, with respect to which said support means can rotate, may coincide with said second axis along which said the first pulleys group is movable.

The invention will be now described by way of illustration but not by way of limitation, with particular reference to the drawings of the enclosed figures, wherein.

In the following, a solution of the counterbalancing structure as applied to a support head for cameras or movie cameras will be described, although it is obvious that it can be utilised in other applications, and that therefore the example cannot be unduly utilised as limitation of the present invention.

By observing FIGS. 1-9, a first embodiment of the counterbalancing structure according to the invention is shown and indicated with the reference number 1.

Said counterbalancing structure 1 is studied to be inserted in the support head of a camera (not shown). A support head for cameras comprises generally a slide for fastening a camera, and a support element 3 integral to an element housing the said slide, and provided below said slide. Said support element 3 can be moved along a first plane or horizontal plane α, to rotate the camera laterally (in the right/left direction or vice versa), and along a second plane or vertical plane β orthogonal to the first plane α, to rotate the camera with respect to the vertical central axis y by an angle equal to 0°-+90° or 0°--90°, from below upwards and vice versa.

In the present text, reference will be made to a vertical plane β parallel to the plane of the lateral views of the enclosed figures.

The counterbalancing structure 1 according to the invention allows to counterbalance the weight or load of the camera during the rotational movement along the second plane or vertical plane β, acting on said support element 3.

Figure 11:
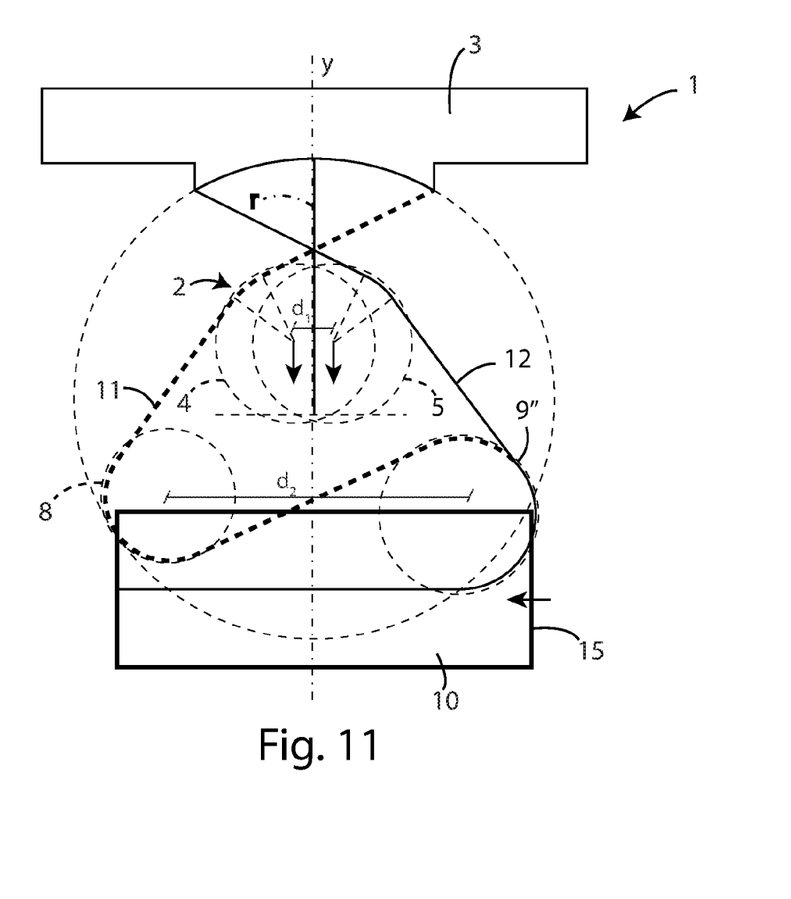
FIG. 11 shows a schematic later view of the counterbalancing structure according to the invention.

Said counterbalancing structure 1, shown schematically also in FIG. 11, comprises a first pulleys group 2 comprising two first pulleys or upper pulleys 4 and 5, for each lateral portion of the structure 1, said first pulleys 4 and 5 being separated with each other by a certain distance $d_1$ along a plane parallel to the second plane or vertical plane β, a second fixed pulleys group 6 comprising three second pulleys or lower pulleys 8, 9' and 9", for each lateral portion of the structure 1, of which two pulleys 9' and 9" have their own rotation axis coinciding and are spaced apart from the third pulley 8 by a determined distance $d_2$ along a plane parallel to the second plane or vertical plane β. Said two upper pulleys 4 and 5 and said three lower pulleys 8, 9', and 9" are disposed in such a way to form two triage having an upper pulley 4 or 5 as upper apex and two lower pulleys 8 and 9' or 8 and 9" at the base angles.

Said counterbalancing structure 1 comprises moreover pre-compressed elastic means 10, in particular a spring, disposed with its own extension axis transverse to the vertical axis y and disposed on a plane parallel to the second plane or vertical plane β and coupled at a first end to a plate 13. In further embodiments, the spring extension axis could be disposed parallel to the vertical axis y of the structure or inclined differently, without thereby falling outside the scope of protection of the present invention.

Further, said counterbalancing structure 1 comprises two ropes or lines 11 and 12, preferably made of steel, for each lateral portion of the structure 1, each rope 11 and 12 being coupled at a first end to said support element 3 and at the second end to the small plate 13 of the spring 10. A first rope 11 is passing on an upper pulley 4 and two lower pulleys 8 and 9' and the second rope 12 is passing through an upper pulley 5 and a lower pulley 9". Said ropes 11 and 12 are configured in such a way to act in compression on said elastic means 10 when a load, such as the camera, is coupled to the support means 3 and when the support means 3 are inclined with respect to said first axis or vertical axis y alternately by an angle equal to 0°-+90° or 0°--90°.

It is evident that transmission means that are equivalent to ropes and lines can be used, such as for example belts or chains, without thereby falling outside the scope of protection of the present invention.

The first upper pulleys group 2 is movable along the vertical axis y, which in the specific case coincides with the vertical axis y of the counterbalancing structure 1, in such a way to vary the load that said support means 3 can support and therefore be able to counterbalancing the load of cameras with different weight, acting always on the pulleys system 4, 5, 8, 9', 9" and ropes 11 and 12 and therefore on the elastic means 10.

Figure 1:
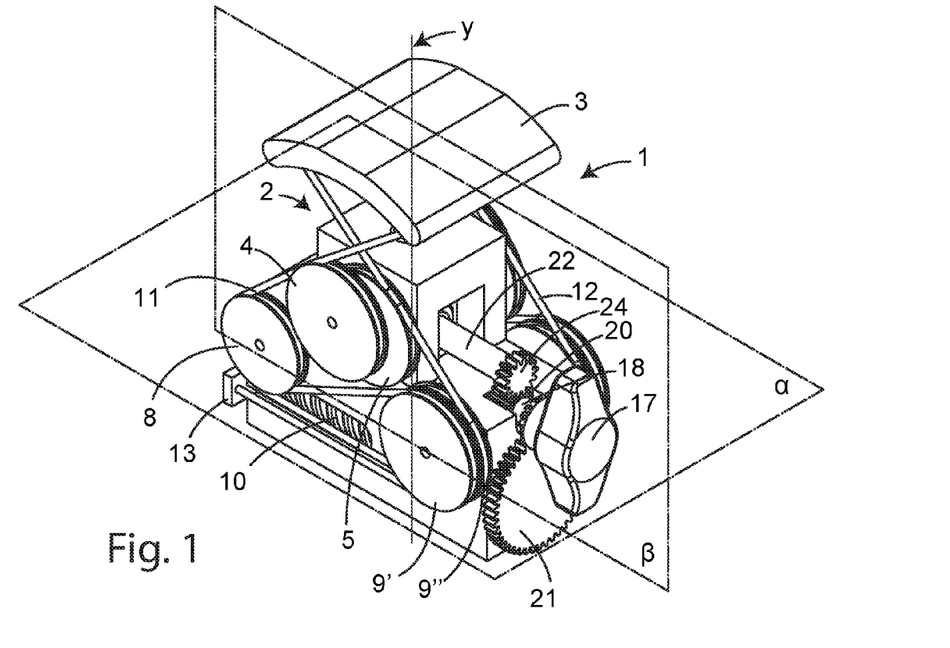
FIG. 1 shows a top perspective view of the counterbalancing structure according to the invention.
Figure 2:
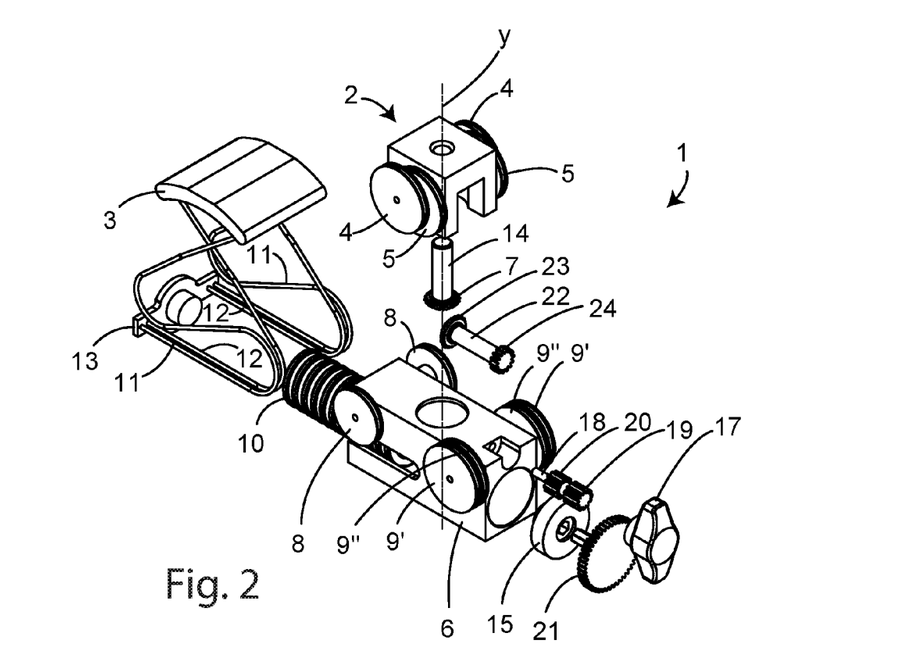
FIG. 2 shows an exploded perspective view of the counterbalancing structure of FIG. 1.
Figure 3A:
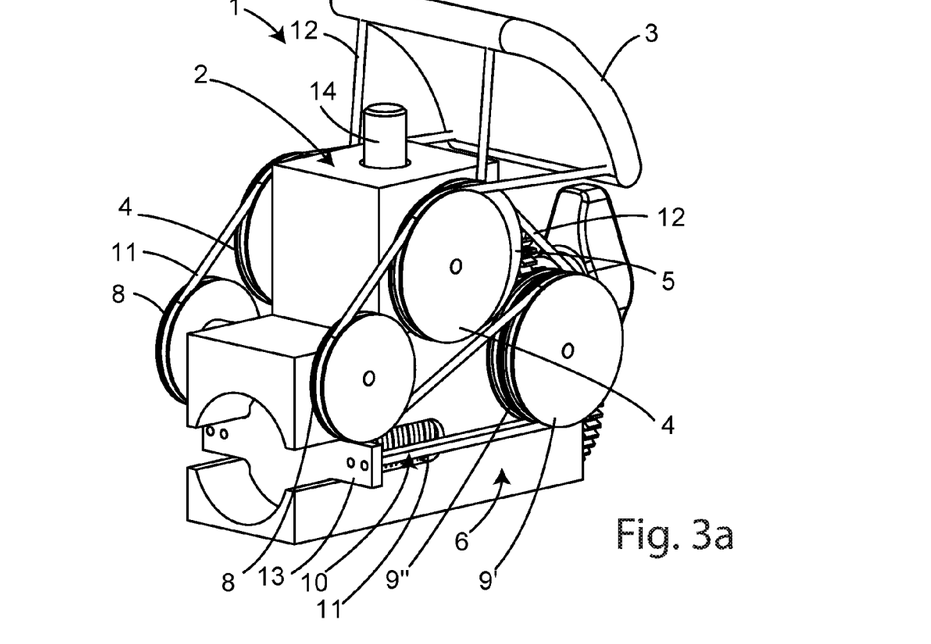
FIG. 3a shows a lateral perspective view of the counterbalancing structure of FIG. 1 in the condition of minimum capacity of the load.
Figure 3B:
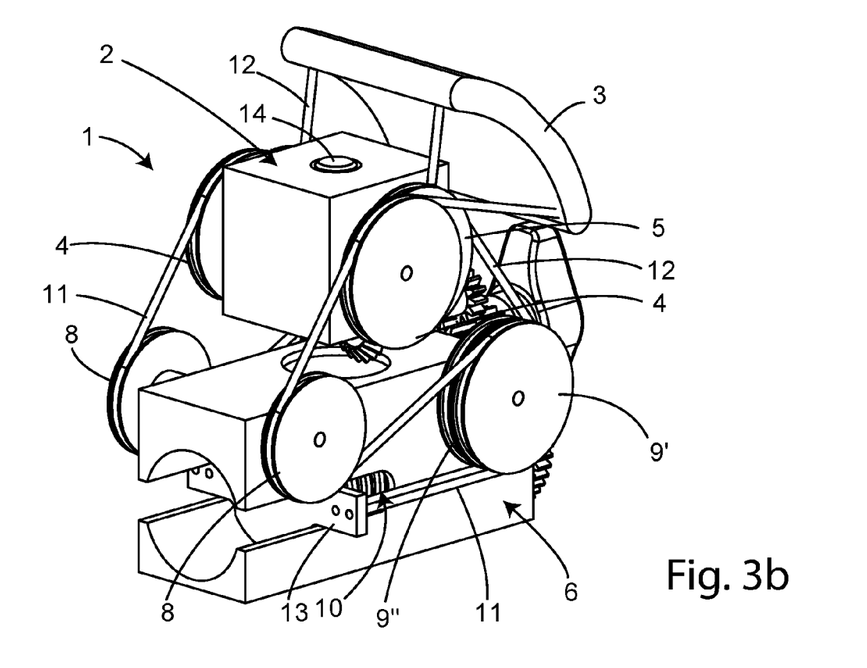
FIG. 3b shows a lateral perspective view of the counterbalancing structure of FIG. 1 in the condition of the maximum capacity of the load.
Figure 4:
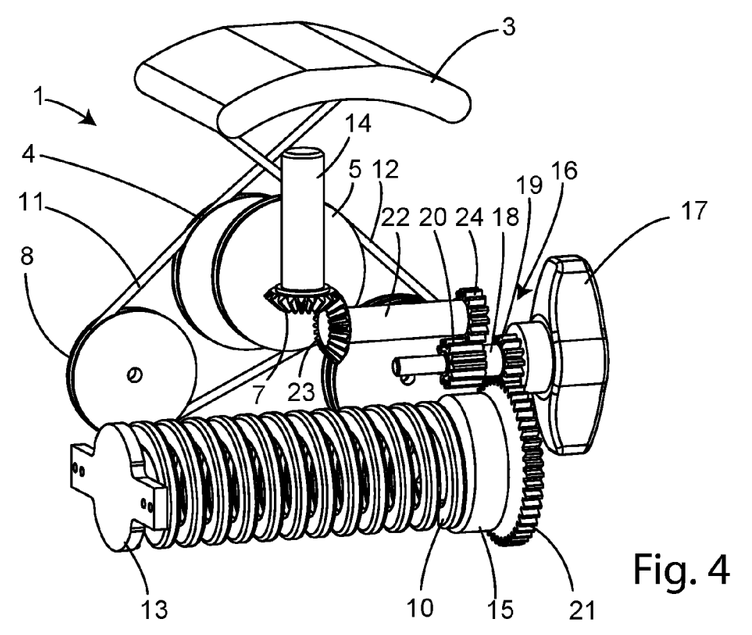
FIG. 4 shows a lateral perspective view of the mechanism of adjusting of the capacity and the pre-loading of the elastic means of the counterbalancing structure of FIG. 1.
Figure 5:
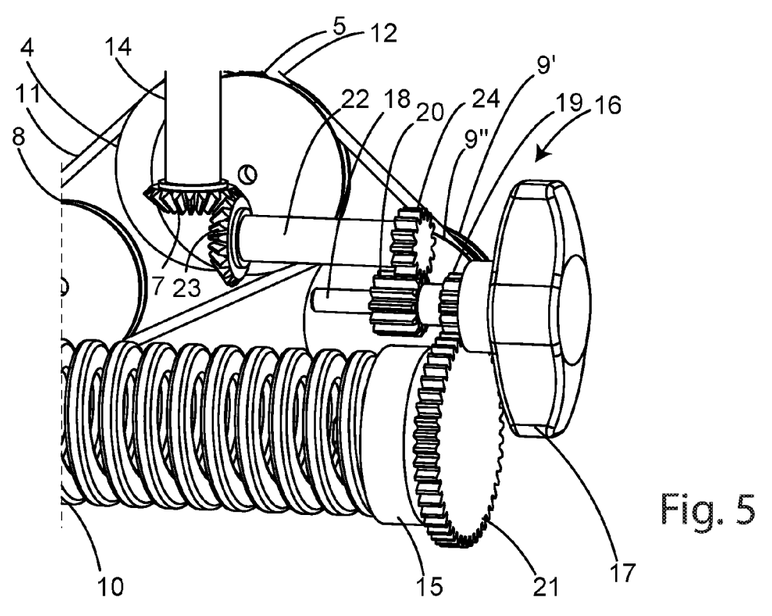
FIG. 5 shows a perspective view of a particular of the adjusting mechanism of FIG. 4.
Figure 6A:
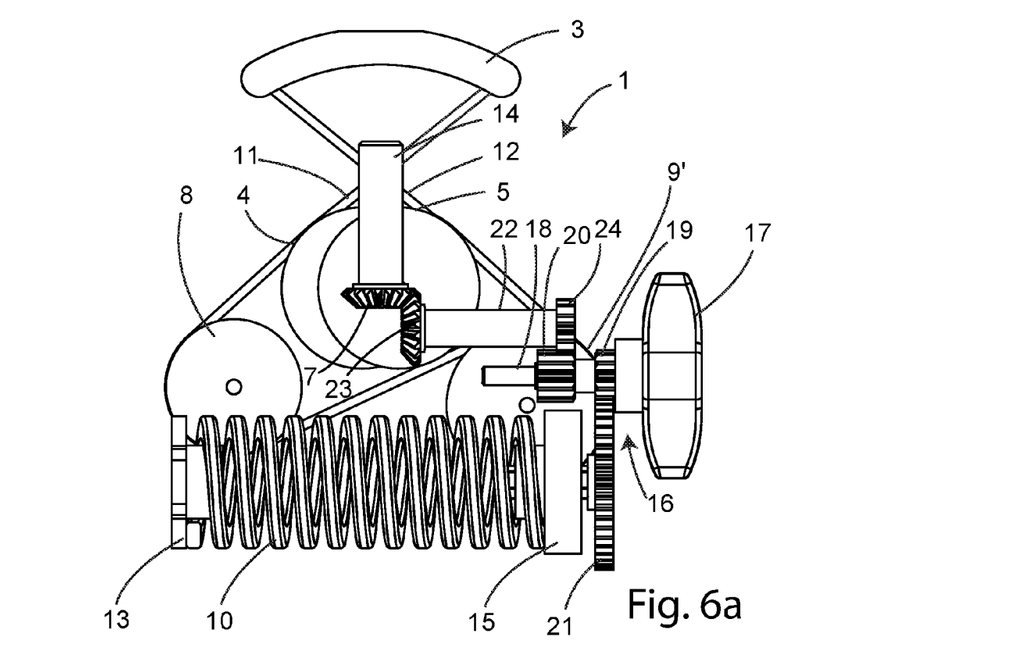
FIG. 6a shows a lateral view of the adjusting mechanism of FIG. 4 in the condition of minimum capacity of the load with the load support means which are inclined by an angle of 0°.
Figure 6B:
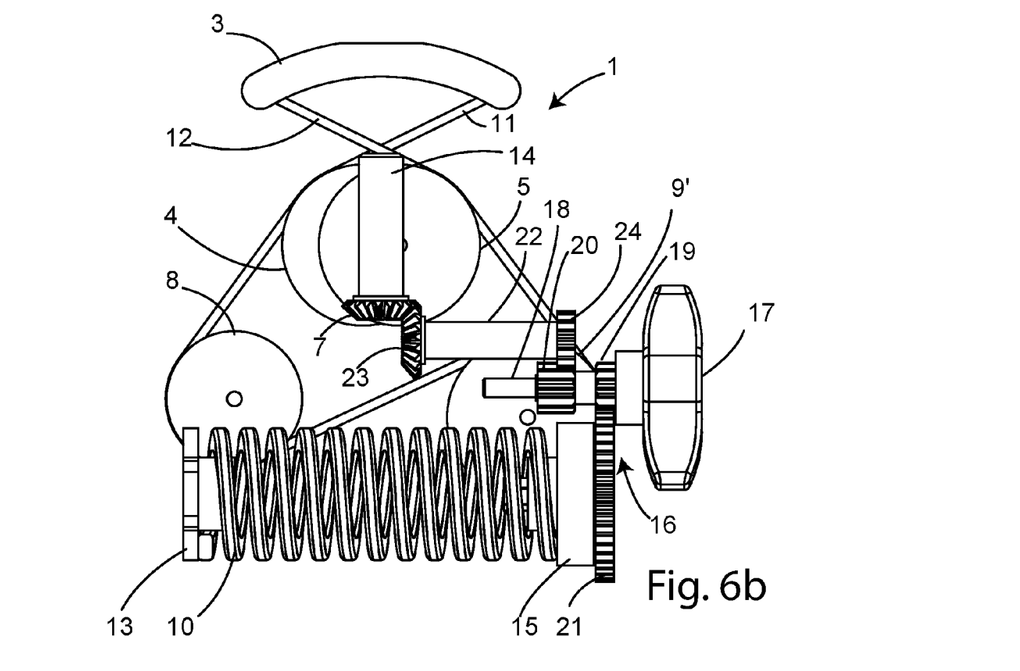
FIG. 6b shows a lateral view of the adjusting mechanism of FIG. 4 in the condition of maximum capacity of the load with the load support means which are inclined by an angle of 0°.
Figure 7A:
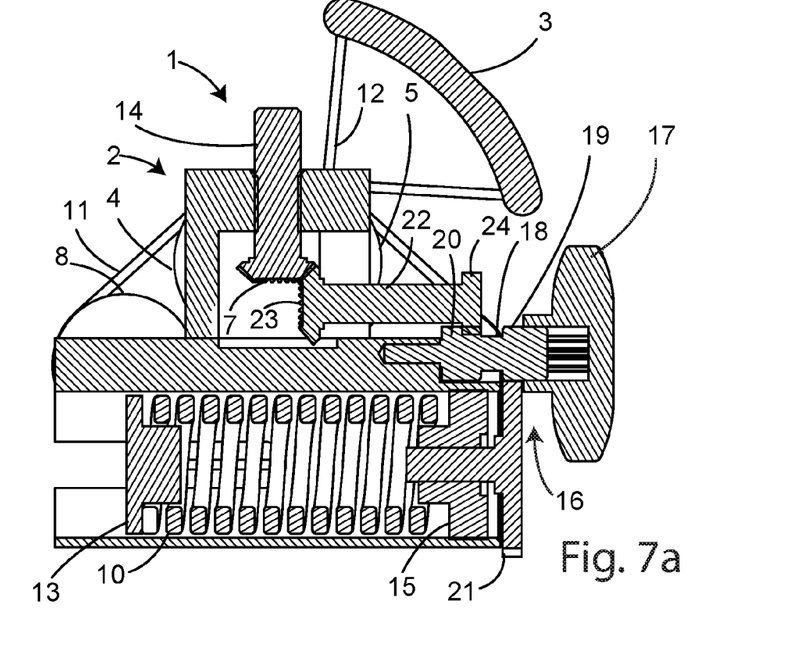
FIG. 7a shows a sectional lateral view of the adjusting mechanism of FIG. 4 in the condition of minimum capacity of the load with the load support means inclined by an angle of around 45°.
Figure 7B:
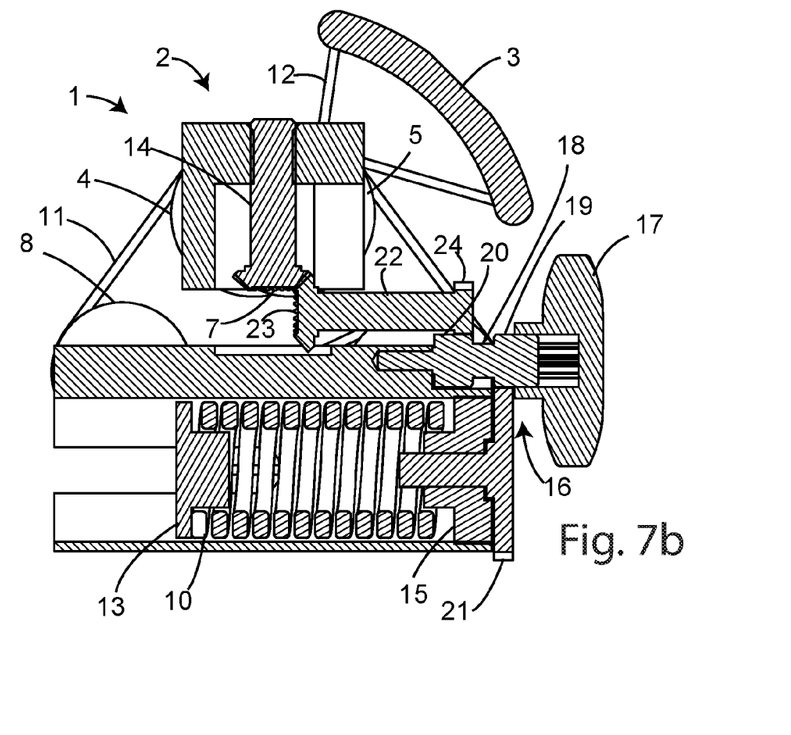
FIG. 7b shows a sectional lateral view of the adjusting mechanism of FIG. 4 in the condition of maximum load capacity with the load the support means which are inclined by an angle of around 45°.
Figure 8:
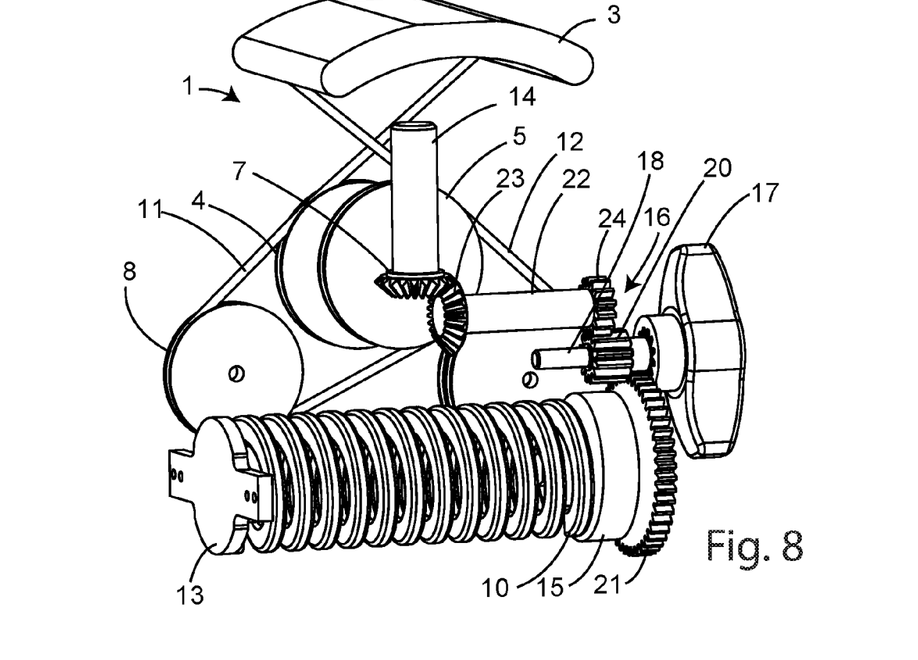
FIG. 8 shows a lateral perspective view of the adjusting mechanism of FIG. 4 during the adjusting of the only capacity of the load support means.
Figure 9:
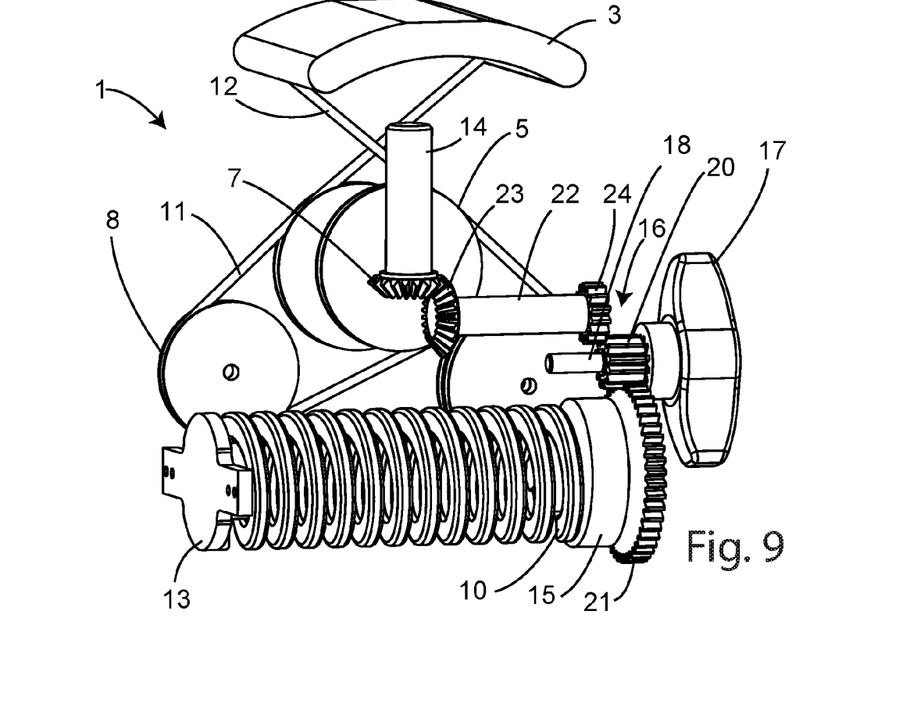
FIG. 9 shows a later perspective view of the adjusting mechanism of FIG. 4 during the adjusting of the only pre-loading of the elastic means.

In particular, the behaviour of the counterbalancing structure 1 is visible from the FIGS. 3a and 3b, wherein one can observe how the first pulleys group 2 can pass from a first position of FIG. 3a of minimum load, to a second position of FIG. 3b of maximum load, wherein the first pulleys group 2 achieved a displacement upwards along the axis y going away from the mass centre of the counterbalancing structure 1 and approaching the support element 3, acting mostly on the ropes 11 and 12 and therefore on the spring 10 in compression.

The movement along the axis y of the first pulleys group 2 is obtained by means of a worm 14 on which said first group 2 slides.

In the shown solution, the spring 10 is provided horizontally even if it could be disposed differently.

The ropes and pulleys transform therefore the rotational movement of the mass centre on the vertical plane into linear movement on the horizontal plane of the spring.

In the embodiment shown in FIGS. 1-9 of the counterbalancing structure 1 according to the invention, a preferred configuration of cables, spring and pulleys is shown. However, other equivalent embodiments come out to fall in any case within the scope of protection of the present invention, such as for example the configuration claimed and described in the Italian patent IT1302411 of the same applicant.

Indeed, to the ends of the present invention, it is sufficient that the counterbalancing structure comprises means of support of a load, such as for example a camera, said support means being able to rotate along a first plane or vertical plane with respect to a first axis or vertical axis, a first movable pulleys system comprising at least a first upper pulley, precompressed elastic means, and at least a rope or line fixed at an end to said elastic means and at the other end to said support means, said rope or line passing at least on said first upper pulley in such a way to act in compression on said elastic means when said load is coupled to said support means and said support means are rotated with respect to said first axis or vertical axis by an angle equal to 0°-+90° and 0°--90°, said at least a first upper pulley being movable along a second axis in such a way to vary the capacity of said support means.

The counterbalancing of the support element 3 with varying inclination angle on plane β with respect to which it is rotated occurs therefore by means of the spring.

Figure 10:
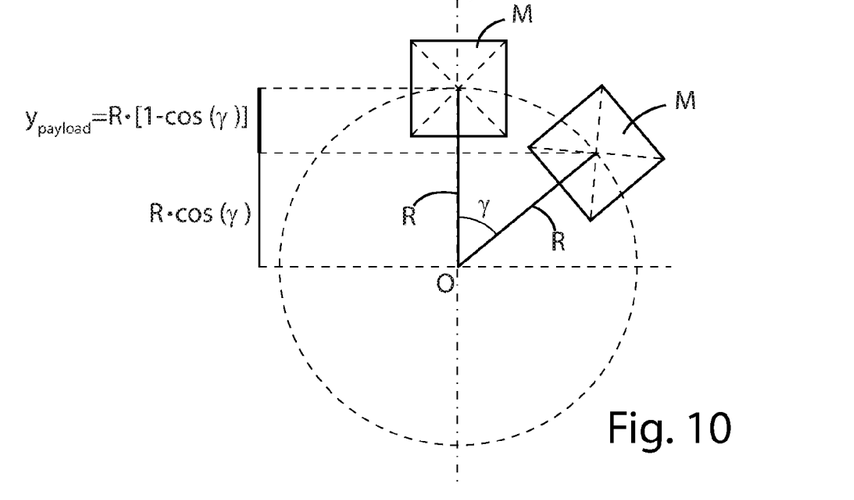
FIG. 10 shows a schematic lateral view of the displacement of a load in a counterbalancing structure for support heads.

Indeed, making reference to the graph of FIG. 10, when a load or a payload of mass M, placed at a distance R along the vertical axis y with respect to the rotation axis O, is rotated by an angle γ with respect to the vertical axis y, its instantaneous potential energy $U_p$ due to the gravity force is equal to:

$$U_p(\gamma) = M \cdot g \cdot y_{payload} = M \cdot g \cdot R [1 - cos(\gamma)]$$

wherein g is the gravity acceleration.

The energy due to the elastic force $U_k(x)$ of the spring by which it is wished to balance the load is equal to:

$$U_k(x) = \tfrac{1}{2} \cdot k \cdot x^2$$

wherein k is the elastic constant of the spring and x is the extension (or shortening).

By an energetic balance between the instantaneous potential energy of the load and the energy provided by the elastic means, it follows that:

$$U_p(\gamma) = U_k(x)$$

$$M \cdot g \cdot R[1 - \cos(\gamma)] = \frac{1}{2} \cdot k \cdot x^2$$

$$x = \sqrt{\frac{2 \cdot M \cdot g \cdot R}{k} \cdot [1-\cos(\gamma)]} = 2 \cdot \sqrt{\frac{M \cdot g \cdot R}{k}} \cdot \sqrt{\frac{1}{2} \cdot [1-\cos(\gamma)]}$$

From the third Werner formula, it comes out to be that:

$$\sin^2\left(\frac{\gamma}{2}\right) = \frac{1}{2} \cdot \sqrt{[1-\cos(\gamma)]}$$

Therefore:

$$x(\gamma) = Q \cdot \sin^2\left(\frac{\gamma}{2}\right)$$

wherein Q is a constant which depends on the elastic constant of the spring k, the mass of the payload M and the height of the mass centre of the payload R with respect to the rotation axis O. Therefore, for a fixed load, it is necessary to increase the compression of the spring when the angle increases.

Figure 12:
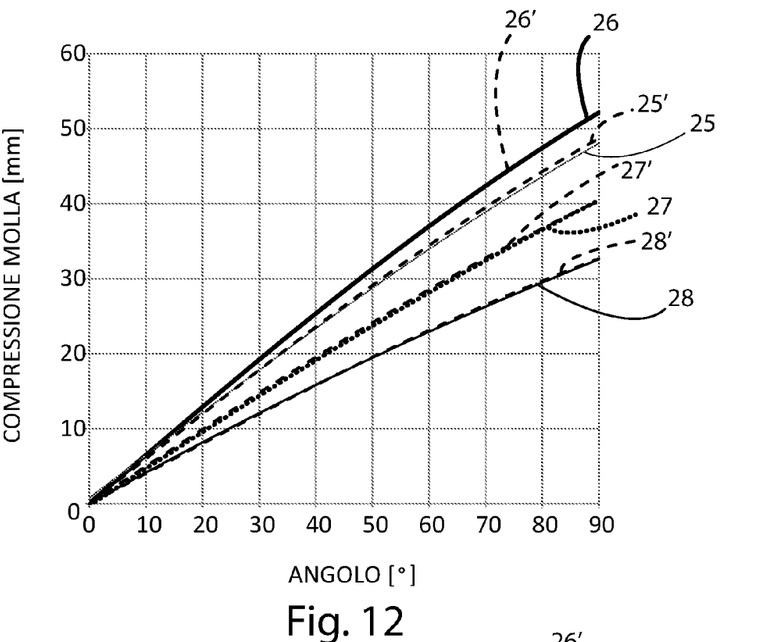
FIG. 12 shows a first graph of the compression of the spring of the counterbalancing structure according to the invention with varying inclination from 0° to 90° of the support head for a maximum and a minimum load as compared with a counterbalancing structure of prior art.
Figure 13:
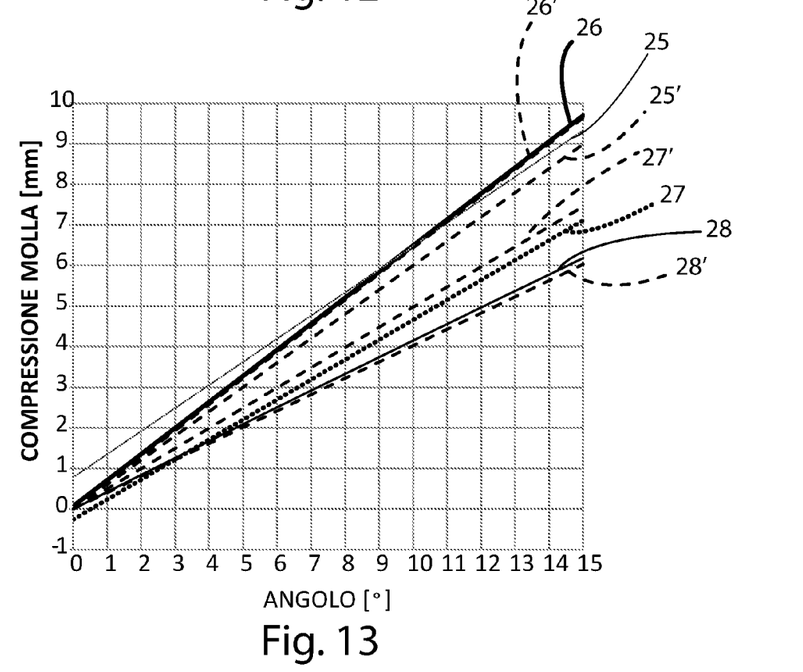
FIG. 13 shows a second graph of the compression of the spring of the counterbalancing structure according to the invention with varying inclination from 0° to 15° of the support head for a maximum and minimum load as compared with a counterbalancing structure of prior art.

However, with varying load, because of the interference of the rope with the pulley, the compression of the spring is not optimal, not being able to guarantee a perfect equilibrium at the different angles (as shown in the graphs of FIGS. 12 and 13).

In order to solve such problems, the counterbalancing structure 1 according to the invention comprises moreover a means 16 of adjusting of the pre-compression of said elastic means 10, which is configured in such a way to adjust the pro-compression of said elastic means 10 with varying load of said support means 3 by means of the movement of said at least first upper pulley 4 or 5 along said second axis or vertical axis y.

Such adjusting mechanism 16 is shown in detail in the FIGS. 4-9 and comprises a plurality of transmission means, in particular gears or gear wheels, which are connected with each other in such a way to transmit the linear motion to the first pulleys group 2 and to a ring nut 15 for adjusting the preload of the spring 10 connected to a second end of the spring 10. In particular, the larger is the height of the second pulleys group 2, to obtain a maximum load capacity, the larger is the moving back of the ring nut 15 to uncompress the spring 10. On the contrary, the smaller is the load to be supported, the smaller is the height of the second pulleys group 2 along said axis y. In particular, said first transmission means are a first main gear 7, specifically a gear wheel, integrally coupled to said worm 14.

The adjusting mechanism 16 comprises moreover second motion transmission means 21 acting on said elastic means 10 in compression, in particular a second main gear 21, specifically a gear wheel, acting on said ring nut 15 for the management of the preload of the spring 10.

Further, the adjusting means 16 comprises third transmission means including a first shaft or first rotation axis 22 on which a first secondary gear 23 and a second secondary gear 24 are coupled, specifically gear wheels. The first secondary gear 23 is adapted to engage with the first main gear 7 of the first transmission means.

Moreover, said adjusting mechanism 16 further comprises fourth motion transmission means including a second shaft or second rotation axis 18, connected to actuator means 17, in particular a knob 17, for the adjusting from outside of the variation of load capacity of the counterbalancing structure 1. On said second shaft 18, a first tertiary gear 19, specifically a gear wheel, adapted to engage with said second main gear 21 of said second transmission means, and a second tertiary gear 20, specifically a gear wheel, adapted to engage with said second secondary gear 24, are coupled. Hence, by rotating the knob 17, the rotational motion is transmitted by the described transmission means both to the second pulleys group 2, adjusting their height, and the ring nut 15 of the spring, adjusting the preload as a function of the load to be supported.

In further embodiments of the counterbalancing structure according to the invention, said fourth transmission means may also be not provided. In such an embodiment, said third transmission means may be configured to transmit the motion from said first to said second transmission means. For example, said second secondary gear 24 could engage directly with said second main gear 21 of said second transmission means and said actuator means 17 could be coupled integrally to said first shaft 18 of said third transmission means, in such a way to allow the adjusting to be supported by said support element 3 and at the same time vary the pre-compression of the spring 10.

The different compression of the spring 10 during the condition of minimal and maximum capacity in the different inclinations of the support element 3 is shown in the FIGS. 6a, 6b, 7a, 7b. From such figures, one observes that for a minimal load (FIGS. 6a and 7a) the second pulleys group 2 is disposed in correspondence of the lowest point of its travel along the sliding axis y and the ring nut 15 is in position of maximum compression of the spring 1. This allows to obtain always an optimal management of the preload of the spring 10 as shown in the graphs of the FIGS. 12 and 13.

In particular, the graphs of FIGS. 12 and 13 show the level of compression of the spring 10 with varying angle of inclination of the support head, and therefore of the support element 3, for a constant load. In particular, in the graphs the curves of a prior art counterbalancing structure and of one according to the invention under maximum load and minimum load as a function of the angle of inclination of the support element 3 and of the compression of the spring 10 are shown. More in particular, the curves 25 and 27 show the prior art structure respectively with a maximum load of 80.13 kg and a minimum load of 50.14 kg as compared with the relevant curves 25' and 27' of the same structure at an optimal theoretic state, having a fixed mass centre and constant equivalent to R=370 nm; and the curves 26 and 28 show the structure according to the invention respectively with a maximum load of 93.43 kg and a minimum load of 35.16 kg as compared with the relevant curves 26' and 28' of the same structure as an optimal theoretic state, having a fixed mass centre and constant equivalent to R=370 nm.

In both graphs, one observes that both for a maximum load and a minimal load the prior art structure is not able to guarantee an optimal counterbalancing with varying inclination of the support element 3.

The counterbalancing structure 1 according to the invention allows advantageously to calibrate the pre-compression of the spring with varying load to be supported, without the necessity of direct interventions on the spring.

The counterbalancing structure has been conceived in such a way to satisfy the above-mentioned elastic means compression law in all the load configurations in the functioning range and for any angle of inclination of the load with respect to the vertical.

The introduced mechanism, therefore, allows to automatically adjust the preload of the elastic means and at the same time the capacity of the counterbalancing structure in such a way to satisfy the energetic balance as above described.

Moreover, the counterbalancing structure according to the invention allows advantageously to counterbalance a load range which is larger than that of the prior art devices, in particular having a weight comprised between 35 kg and 90 kg.

Preferably, said fourth transmission means can be configured in such a way to be able to act alternately on both said first means and second means of transmission, or only on said first transmission means or only on said second transmission means.

More in particular, said second tertiary gear 20 of said fourth transmission means can be configured in such a way to engage alternately on said second secondary gear 24 of said third transmission means, or on said second main gear 21 of said second transmission means.

This is obtained by suitably dimensioning the gears 19, 20, 21 and 24 and suitably spacing apart the first tertiary gear 19 from the second tertiary gear 20 on the second shaft 18.

Indeed, said tertiary gears 19 and 20 present a width and are spaced apart with respect to each other on said second shaft 18 in such a way that said fourth transmission means are able to pass between a first position, wherein said second tertiary gear 20 is engaged with the said second main gear 21 of said second transmission means, or a second position, wherein said second tertiary gear 20 is engaged with said second secondary gear 24 of said third transmission means, or a third position, wherein said second tertiary gear 20 is engaged with the said second secondary gear 24 of said third transmission means and at the same time said first tertiary gear 19 is engaged with said second main gear 21 of said second transmission means.

Such a feature allows advantageously to perform separately a calibration of the pre-compression of the spring and the height of the first movable pulleys group in the factory or in an assistance centre.

In the foregoing, preferred embodiments have been described and variations of the present invention have been suggested, but it is to be understood that those skilled in the art will be able to make modifications and variations without thereby falling outside the relevant scope of protection, as defined by the enclosed claims.

The invention claimed is:

1. Counterbalancing structure (1) for counterbalancing a load, said counterbalancing structure (1) comprising support means (3) for the support of said load, said support means (3) being able to rotate along a plane or vertical plane (β) with respect to a first axis or vertical axis (y) laying on said plane (β), a first movable pulleys group (2) comprising at least a first upper pulley (4, 5), precompressed elastic means (10), and at least a rope or line (11, 12) fixed at a first end to said elastic means (10) and at the second end to said support means (3), said at least a rope (11, 12) passing at least on said at least a first upper pulley (4, 5) such to act in compression on said the elastic means (10) when said load is coupled to said support means (3) and said support means (3) are rotated with respect to said first axis or vertical axis (y) by an angle equal to 0°-+90° or 0°--90° in order to counterbalance the weight of said load, said at least a first upper pulley (4, 5) being movable along a second axis (y) in such a way to vary the capacity of the load of said support means (3) and in such a way to be able to counterbalance the weight of said load when it is coupled to said support means (3), said counterbalancing structure (1) being characterised in that it comprises an adjusting mechanism (16) for the adjusting of the pre-compression of said elastic means (10) configured in such a way to adjust the pre-compression of said elastic means (10) with varying load to be supported by said support means (3) by means of the movement of said at least a first upper pulley (4, 5) along said second axis (y).

2. Counterbalancing structure (1) according to the previous claim, characterised in that said adjusting mechanism (16) is configured in such a way to act on said elastic means (10) in such a way to increase the pre-compression of said elastic means (10) when said at least a first upper pulley (4, 5) is disposed in the point along said second vertical axis (y) which is the most distant from said support means (3) and in such a way to decrease the pre-compression of said elastic means (10) when said at least a first upper pulley (4, 5) is disposed on the point along said second vertical axis (y) which is closest to said support means (3).

3. Counterbalancing structure (1) according to claim 1, characterised in that said adjusting mechanism (16) comprises first transmission means (7) for the transmission of the linear motion of said at least a first pulley (4, 5) along said second axis (y), second transmission means (21) acting on said elastic means (10) in compression, and third transmission means (22, 23, 24) for transmitting the motion of said first (7) to said second (21) transmission means.

4. Counterbalancing structure (1) according to claim 1, characterised in that said adjusting mechanism (16) further comprises fourth motion transmission means (18, 19, 20) disposed between said third (22, 23, 24) and said second (21) transmission means and in that said fourth transmission means (18, 19, 20) are configured in such a way to engage alternately with both said third (22, 23, 24) and said second (21) transmission means, or only with said third transmission means (22, 23, 24) or only with said second transmission means (21) in order to allow the individual adjusting.

5. Counterbalancing structure (1) according to claim 3, characterised in that said adjusting mechanism (16) comprises actuator means (17) connected to said third transmission means (22, 23, 24) or to said fourth transmission means (18, 19, 20) in such a way to vary the capacity of the load to be supported by said support means (3) and at the same time to adjust the pre-compression of said elastic means (10).

6. Counterbalancing structure (1) according to claim 3, characterised in that said transmission means comprises gears (7, 19, 20, 21, 23, 24), preferably gear wheels.

7. Counterbalancing structure (1) according claim 6, characterised in that said fourth transmission means (18, 19, 20) comprise a first gear (19) and a second gear (20) coupled to a shaft (18), said gears (19, 20) of said fourth transmission means (18, 19, 20) having a width and being spaced apart from each other on said shaft (18) in such a way that said fourth transmission means (18, 19, 20) are able to pass from a first position, wherein said second gear (20) of said fourth transmission means (18, 19, 20) is engaged with a gear (21) of said second transmission means (21), a second position, wherein said second gear (20) of said fourth transmission means (18, 19, 20) is engaged with a gear (24) of said third transmission means (22, 23, 24), or a third position, wherein said second gear (20) of said fourth transmission means (18, 19, 20) is engaged with said gear (24) of said third transmission means (22, 23, 24) and at the same time said first gear (19) of said fourth transmission means (18, 19, 20) is engaged with said gear (21) of said second transmission means (21).

8. Counterbalancing structure (1) according to claim 6, characterised in that said third transmission means (22, 23, 24) comprise a first gear (23) and a second gear (24) which are coupled to a shaft (22), wherein said first gear (23) of said third transmission means (22, 23, 24) is adapted to engage with a gear (21; 20) of said second (21) or said fourth (18, 19, 20) transmission means.

9. Counterbalancing structure (1) according to claim 1, characterised in that it comprises a second fixed pulleys group comprising at least a lower pulley (8,9',9") through which said at least a rope (11, 12) passes before coupling to said elastic means (10).

10. Counterbalancing structure (1) according to claim 1, characterised in that said first pulleys group (2) comprises a worm (14) acting on said at least an upper pulley (4, 5) for its movement along said second axis (y).

11. Counterbalancing structure (1) according to claim 1, characterised in that said elastic means (10) comprise a spring (10), a plate (13), coupled at the first end of said spring (10) and coupled to said first end of at least a rope (11,

12), and a preload ring nut (15) acting in compression on the opposite end of said spring (10) and in connection with said adjusting mechanism (16).

12. Counterbalancing structure (1) according to claim 1, characterised in that said first axis or vertical axis, with respect to which said support means (3) can rotate, coincides with said second axis (y) along which said the first pulleys group (2) is movable.

* * * * *